United States Patent
Griessinger

(10) Patent No.: US 12,429,858 B2
(45) Date of Patent: Sep. 30, 2025

(54) METHOD AND APPARATUS FOR MONITORING A CONDITION OF A COMPONENT OF A PROCESSING ENGINEERING PLANT

(71) Applicant: Siemens Aktiengesellschaft, Munich (DE)

(72) Inventor: Konrad Moritz Griessinger, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 18/185,439

(22) Filed: Mar. 17, 2023

(65) Prior Publication Data

US 2023/0297090 A1 Sep. 21, 2023

(30) Foreign Application Priority Data

Mar. 18, 2022 (EP) .................................. 22163000

(51) Int. Cl.
*G05B 19/418* (2006.01)
*G06N 20/00* (2019.01)

(52) U.S. Cl.
CPC ... *G05B 19/41865* (2013.01); *G05B 19/4183* (2013.01); *G06N 20/00* (2019.01)

(58) Field of Classification Search
CPC .............................................. G05B 19/41865
See application file for complete search history.

(56) References Cited

U.S. PATENT DOCUMENTS

| 9,842,302 B2 * | 12/2017 | Bates ................... G05B 23/024 |
| 2022/0075515 A1 | 3/2022 | Floren et al. |
| 2022/0197272 A1 | 6/2022 | Shinha et al. |
| 2024/0019849 A1 * | 1/2024 | Ziobro ............... G05B 19/4184 |

FOREIGN PATENT DOCUMENTS

| WO | 2020198249 | 10/2020 |
| WO | 2022035427 | 2/2022 |

OTHER PUBLICATIONS

EP Search Report dated Sep. 7, 2022 based on EP22163000 filed Mar. 18, 2022.

\* cited by examiner

*Primary Examiner* — Mark A Connolly
(74) *Attorney, Agent, or Firm* — Cozen O'Connor

(57) ABSTRACT

Method and apparatus for monitoring a condition of a component of a process engineering plant which includes a large number of interconnected components, wherein the condition of a component is determined based on process variables of a sensor relevant for the component and corresponding data sets are recorded and stored for each sensor, where a graphic is generated from a digital flow diagram of the technical plant, where within the graphic, a node is selected as target node that corresponds to the component whose condition is to be monitored via an ML algorithm, where the ML algorithm is trained and with the trained ML algorithm the condition determination of the component represented by the target node selected in advance is significantly improved.

9 Claims, 6 Drawing Sheets

METHOD AND APPARATUS FOR MONITORING A CONDITION OF A COMPONENT OF A PROCESSING ENGINEERING PLANT

BACKGROUND OF THE INVENTION

1. Field of the Invention

The invention relates to a computer program, computer program product, an apparatus and method for monitoring a condition of a component of a process engineering plant.

2. Description of the Related Art

The term condition monitoring means that the technical condition of a machine or a machine part is regularly or permanently detected with the aid of sensors, and the accrued sensor data is analyzed for further use. Meaningful measurement values of the sensors are mostly physical variables, such as temperature, pressure, vibrations, humidity, and/or fill levels.

Condition monitoring is used in particular for process engineering components of complex process engineering plants in the process industry. Here, the term (process engineering) component comprises various machines or units of the plant, such as for example containers, pumps, valves, heat exchangers and the connections between them, in particular piping. All components are used to convey certain media, such as liquids, gases or solids, to separate them, to control their temperature, to cause them to react, or to alter them in another manner with regard to composition, type or properties. The sensors within a process engineering plant are configured to detect process variables, such as temperature, pressure, and/or fill levels.

The simplest kind of condition monitoring consists in considering each sensor measurement value that is connected to a device, and to analyze it for anomalies, i.e., to check whether the current value lies within predefined limit values, which means that the machine is in correct order. If the current value lies outside the limit values, then the device is not in correct order and an alarm is sent.

In order to identify anomalies in sensor data, methods based on machine learning are frequently used. In what is known as "machine learning" (abbreviation ML), an artificial, computer-implemented system learns patterns and relationships from data. In this manner, following completion of the learning phase, relationships in general, outliers and unknown patterns can be identified from examples, which are based on historic data. To this end, algorithms build a statistical mode, which is based on training or learning data. If a machine learning algorithm (ML algorithm) is to be trained, in order to monitor or predict the behavior of a process engineering component in an industrial plant, for example, then a training data set has to be supplied to the algorithm in advance.

In large and complex process engineering plants, sensor data from a wide variety of origins frequently overlaps. In many cases, the training data set for a machine learning model contains data of sensors that is irrelevant to the behavior of the component to be monitored. Furthermore, the values recorded via the sensors are mostly provided with noise. This makes it more difficult to train the algorithm or the model, meaning that patterns and relationships of the sensor data are poorly identified and the monitoring of components leads to false statements.

Improvements in the condition monitoring via machine learning can be achieved through the use of extremely large data sets, in particular through the improvement of the training. Such large quantities of data are not always available, however, and furthermore the training with such a data set would be correspondingly lengthy and complicated. By manually selecting data sets of sensors that are not required for the monitoring of a component in a technical plant, the quality of the training (and also of the evaluation) can be improved. This is disadvantageously associated with a large amount of work. This is joined by the problem that domain-specific knowledge of the technical plant is frequently required for determining the relevant sensor data sets. In such cases, a person specialized in the field of data analysis without a sufficient overview of the process engineering process in a technical plant depends on collaboration with a person with knowledge of the domain, which in addition to the large amount of work represents a considerable additional effort for multiple people, and frequently cannot be implemented for many projects.

SUMMARY OF THE INVENTION

It is an object of the invention to provide an apparatus and method for improving the condition monitoring of components of process engineering plants via machine learning (ML) algorithms, and in particular to reduce the large amount of work when selecting training data sets for the ML algorithms used.

This and other objects and advantages are achieved in accordance with the invention by a computer program, a computer program product, an apparatus and method in which the ML algorithms used for the condition monitoring of components of technical plants deliver significantly better results if the structure of the plant, as specified by a flow diagram, is taken into consideration when teaching the ML models. The only prerequisite for this is the presence of a digital flow diagram.

In accordance with the invention, from the available digital flow diagram of a process engineering plant, which contains the structure of the technical plant with its components and the functions thereof as additional information and the functional relationships thereof, a graphic is generated which, according to the additional information and relationships specified from the flow diagram, contains the components of the technical plant as nodes and the functional relationships between the components as working lines, according to a flow direction of the flow diagram. In the graphic, a node is selected as a target node. The target node corresponds to a component, the condition of which is to be monitored via an ML algorithm. According to a rule and/or a metric, input nodes of the target node selected in advance are subsequently ascertained, and sensor data sets of the input nodes that are relevant for the monitoring of the component are monitored. The data sets of the relevant sensors of the input nodes are used as input data for the training for the ML algorithm of the target node. With the output data, the results, of the ML algorithm, the condition of the component to be monitored is determined.

The main advantage of the invention lies in the quality of the training of the ML algorithm and the use of the ML algorithm being considerably improved during the condition monitoring of components of technical plants, via a targeted specification of input data sets for the ML algorithm that is solely oriented toward the structure of the plant. Here, domain-specific knowledge of the technical plant is not required. By specifying a rule and/or metric, tedious, manual selection of relevant sensor data sets is dispensed with. After selecting the component to be monitored, which is represented as the target node in the graphical representation, the method can proceed in a predominantly automated manner, where the output data of the ML algorithm is delivered in a rapid and reliable manner. As a rule, the result of the ML algorithm will involve at least one process variable, which characterizes the condition of a component of the technical plant.

In a particularly advantageous embodiment, an operator can determine, i.e., specify or select, a rule and/or metric himself. This allows a high level of flexibility of application. It is conceivable, for example, for an operator to select certain metrics for the relationships between the target and the input nodes based on a menu of a graphical user interface. Alternatively, the process variables detected by certain sensors can be entered into the input node on the basis of an input menu. The presently contemplated embodiment allows the operator to optimize the method, because different constellations of metrics or different rules can be entered to assess the calculation result of the ML algorithm.

In further advantageous embodiments of the method in accordance with the invention, the data sets for each sensor correspond to either measurement values of the process variables or simulated values of the process variables. Data sets of measurement values of the process variables recorded in real time allow condition monitoring of components during ongoing operation of the technical plant. If simulated sensor data sets are used, then it is possible to apply the method in accordance with the invention, for example, before commissioning a technical plant. In particular, a digital twin of the technical plant could deliver the data sets for the monitoring of the plant, meaning that the teaching of the ML algorithm via the simulated data sets can occur outside of the operation of the technical plant.

In a further advantageous embodiment of the method in accordance with the invention, the training of the ML algorithm occurs in advance or during ongoing operation of the technical plant. Extracting the method step of the training allows improved condition monitoring, because the actual condition determination only occurs with a taught algorithm, which leads to better calculation results.

In this context, it is particularly advantageous if it is possible to set the time range of the training. Thus, an operator can himself check when the ML algorithm delivers the best results.

The objects and advantage are achieved in accordance with the invention by an apparatus for implementing the method in accordance with disclosed embodiments of the invention.

The objects and advantages are further achieved in accordance with the invention by a computer program, in particular a software application, with program code instructions that can be executed by a computer to implement the disclosed embodiments of the method, when the computer program is executed on a computer.

The objects and advantages are also achieved in accordance with disclosed embodiments of the invention by a computer program product, which has a storage medium, upon which a computer program is stored, which implements the disclosed embodiments of the invention.

The computer program product advantageously can be transferred to a working memory of a computing unit, from which it can be executed with the aid of at least one CPU. The computer program product advantageously can be stored on a data storage unit such as a USB stick, a hard disk drive or a CD-ROM/DVD-ROM, from which it can be retrieved or installed on the computing unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in greater detail below on the basis of the exemplary embodiments represented in the figures in simplified schematic representations, in which.

DETAILED DESCRIPTION OF THE EXEMPLARY EMBODIMENTS

A prerequisite for the present invention is the presence of a flow diagram in digitized form. A flow diagram is an aid in the form of a technical drawing within process technology. A flow diagram of a process engineering plant contains the structure of the plant with its components and the functions and functional relationships thereof as additional information. One embodiment of such a flow diagram is the piping and instrumentation diagram (also: P&I diagram, P&ID). It shows the linking of the lines, the flow directions and all fixtures of piping. Digitized flow diagrams can be generated via plant planning tools, such as COMOS by Siemens AG, for example.

When technical plants and flow charts are mentioned in the present invention, these also include individual sub-plants or sub-flow charts that are autonomous or connected (or to be connected) to one another.

Figure 1:
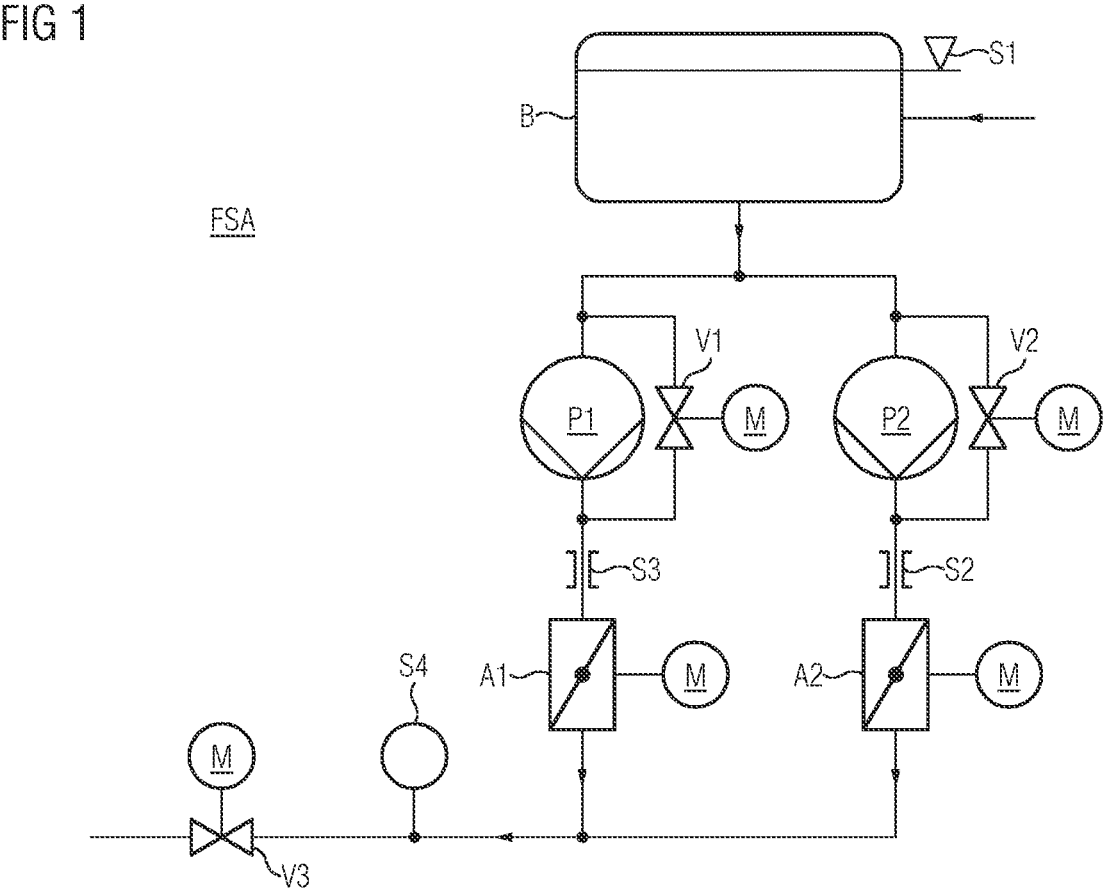
FIG. 1 shows an exemplary cutout of a flow diagram of a process engineering plant in accordance with the invention.

FIG. 1 shows an exemplary cutout of a piping and instrumentation diagram of a process engineering plant. The cutout FSA contains graphical process objects that represent the different components of the plant, such as pumps, containers and/or shut-off flaps or valves, and the pipework of the plant is linked together accordingly. The process objects usually also contain technical information regarding the parameters of the components that they represent, such as piping diameter or fill volume of a container (not shown here). The flow diagram cutout FSA shown here shows a container B, on which the fill level is measured via a sensor S1. The flow in and out of the container B can be identified by working lines with arrows. The flow out of the container branches into two lines. Located in the corresponding piping sections are pumps P1 and P2 with associated valves V1 and V2 and sensors S3 and S2 for measuring the flow rate at the pump outlet. Shut-off flaps A1 and A2 are arranged downstream of the pumps P1 and P2 in the flow direction. Arranged further in the flow direction of the shared drain pipe are a pressure sensor S4 and a further valve V3. In addition to the sensor system, which is represented by the sensors S1, S2, S3 and S4 here, the actuators (represented by motors M for driving parts of the components) of the plant can also be found in the flow diagram with the corresponding technical information (not shown here). Process variables such as pressure, temperature, fill level or flow rate, are measured via the sensors. For each sensor, corresponding data sets, which may consist of time series data of the measured process variables, for example, are recorded and stored in temporary storage or a database.

The cutout FSA clearly indicates that the condition of a component (for example, the container B, the pumps P1 and P2 or the shut-off flaps A1 and A2) can be determined based on a number of sensors. The component of the pump P1 has a direct working relationship with the sensors S1, S3 and S4. The working lines or working relationships can be limited in one direction or can be bidirectional, i.e., can act in two directions. These working relationships can now be recorded in a simplified manner in a graphical representation.

Figure 2:
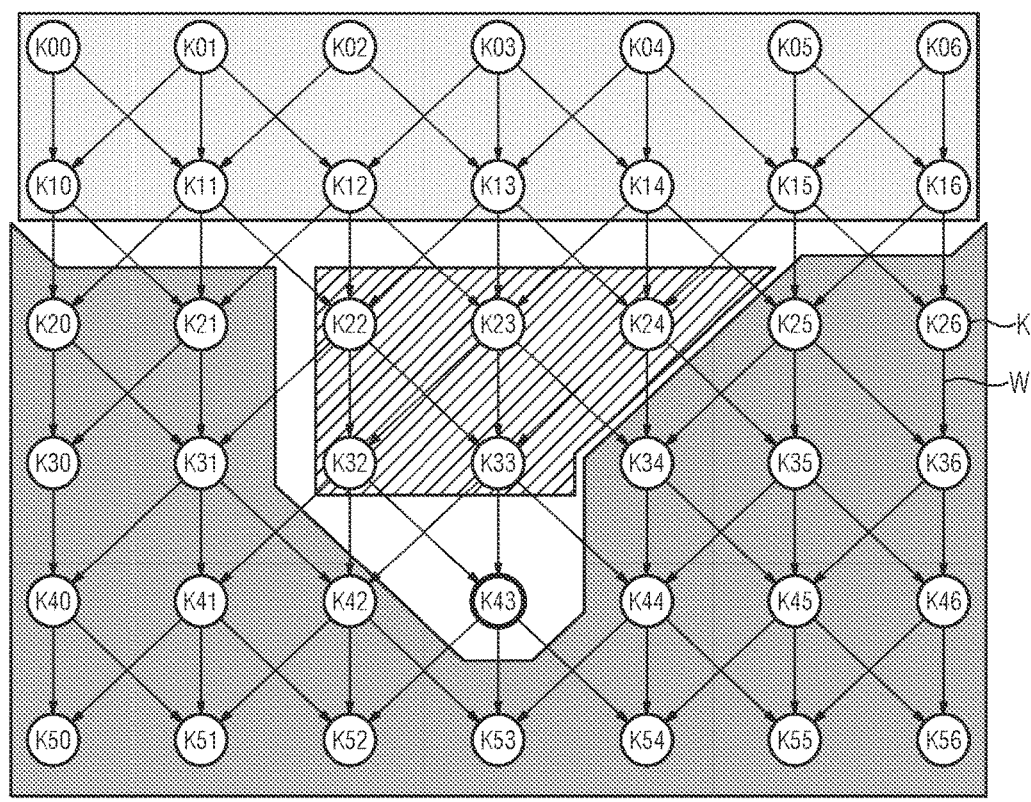
FIG. 2 shows a graphic corresponding to a first exemplary embodiment of the present invention.
Figure 3:
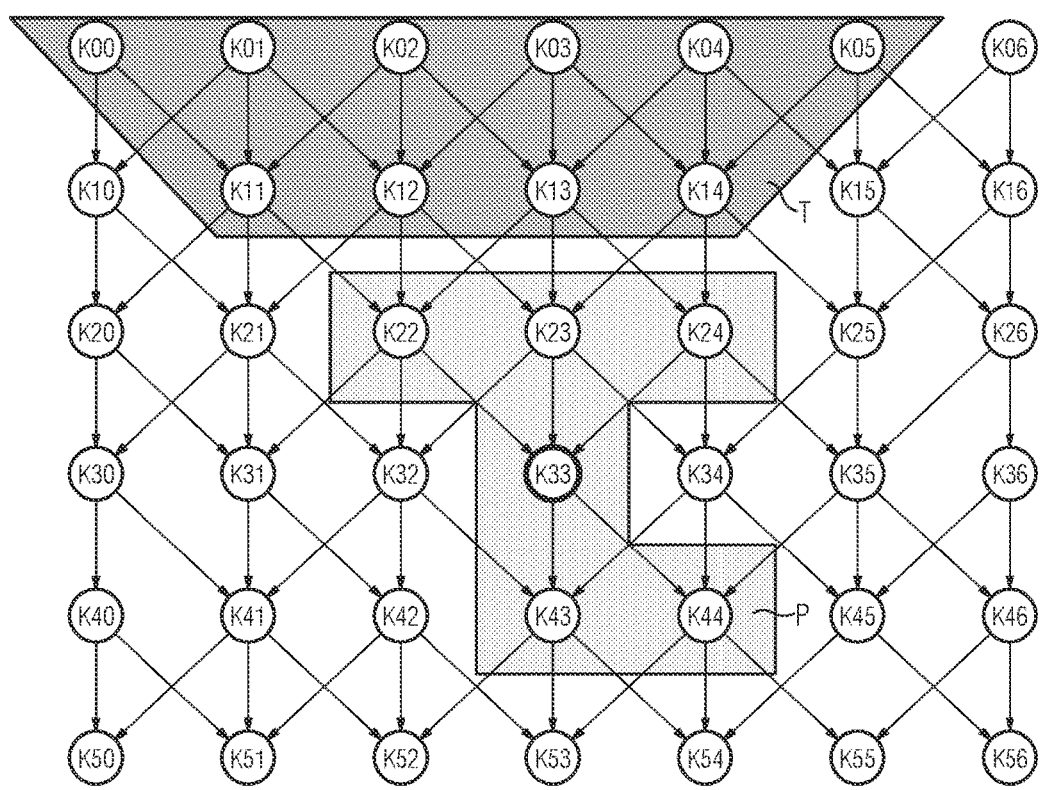
FIG. 3 shows a graphic corresponding to a second exemplary embodiment of the present invention.

One embodiment of a graphical representation is shown in FIGS. 2 and 3. A graphic in the context of the invention comprises any schematic representation which contains, according to the additional information and relationships specified from the flow diagram, the components of the technical plant as nodes K and the functional relationships between the components as working lines W with a directional indication according to a flow direction of the flow diagram, or also at least partially bi-directionally. Working lines according to a flow direction of the flow diagram can accordingly have one direction (for the flow of a medium through a pipe in one direction) or can be bidirectional (in the case of a pressure compensation pipe). This can involve a knowledge graph, for example. However, the invention is not limited to a knowledge graph. Various kinds of graphics or ontologies can be used, provided that the kind of objects and the connection between any two given objects can be queried.

In one exemplary embodiment, the plant planning tool supports the exporting of the digital P&I diagram in what is known as the DEXPI format. The abbreviation DEXPI stands for "Data EXchange in the Process Industry". The DEXPI format corresponds to a neutral data format, with the aid of which neutral process information can be exchanged between software products from various manufacturers of engineering tools. A digital flow diagram in DEXPI format can itself be used as a graphic or can be converted into another format. This includes all devices and sensors, as well as the connections between them, with direction, in a simplified graphical representation. A shared data model represents the basis for the graphics. When transferring a P&ID into a graphic, a data transfer occurs, which is to contain graphics, symbols, topology, all technical attributes, lists, and/or selection lists, in order to enable a seamless continuation of the functions of the P&ID in the target system.

If a digital P&I diagram is present, for example, in the form of a knowledge graph or a similar ontology, then it can subsequently be ascertained which sensors in the respective application case have a relevant relation to a device to be monitored or a component to be monitored of a process engineering plant, and thus are particularly relevant for the training of an ML algorithm.

If the condition of a certain device or a component of a process engineering plant is accordingly to be monitored via an ML algorithm, then for example an operator of the method in accordance with the invention, which in one embodiment can be implemented as a computer program product, in one step selects a node of the graphical representation as target node. The target node within the graphical representation corresponds to a component, the condition of which is to be monitored. Alternatively, the selection of the target node can occur automatically and/or can be specified by a piece of software. An ML algorithm is to be trained for the target nodes.

In the next step, the sensor data sets are to be determined, which have a working relationship with the component of the target node and thus determine the condition of the component to be monitored of the target node. The components and sensors, which are relevant for the monitoring of the component to be monitored of the target node, are referred to as input nodes in the graphical representation. This can involve both nodes arranged upstream of the target node in the flow direction and nodes arranged downstream of the target node in the flow direction. Which input nodes (components) are relevant for the condition determination of the component of the target node follows from the respective application case. In accordance with the invention, it is also possible to specify certain input nodes according to a metric or a rule.

In the context of this invention, a metric is understood to mean a distance function or any given distance measure, as is defined in mathematics between two points in space. In this context, this may involve the length of the shortest path, resistance distance or Euclidean distances, for example. In principle, a metric is to determine how "close" the (working) connection between sensor and device to be monitored has to be, in order for the sensor to be considered relevant. In the simplest case, the closest neighboring nodes, with the sensor data sets thereof, could be selected as input nodes. Frequently, however, more complicated cases arise from the application case. If the temperature is to be determined, for example, which will prevail at a component of the target node in 5 minutes, and the liquid to be transported in the supplying piping requires approx. 1+−0.3 minutes to reach the next component in each case, then it would be sensible to only choose the nodes lying upstream at a distance of between 4 and 6 nodes from the target node as input nodes. Here, the selection of the input nodes would accordingly occur in accordance with a rule. Another example of a rule would be to select all pressure sensors at a distance of at most one node downstream as input nodes, as well as all temperature sensors of the node lying upstream at a distance of 2 to 3 nodes from the target node.

In a particularly advantageous embodiment of the invention, the rules and metrics regarding which nodes of the graphical representation are to be defined as relevant input nodes for the corresponding application case can be specified by an operator (a data analyst or a domain expert). The rules and metrics regarding which nodes are considered relevant for the specific problem can be compiled once, for example, and subsequently can be applied to all sufficiently similar devices/target nodes (for example, to all similar pumps of the plant). Thus, without considerable additional effort, all sufficiently similar devices/target nodes and thus the entire plant are monitored in this regard during the ongoing operation.

As each node of the graphical representation represents a component of the process engineering plant that is connected to various sensors (cf. also FIG. 1), the determination of the input nodes accordingly also produces the sensor data sets that are relevant for the condition determination of the component of the target node and are used as input data for training for the ML algorithm of the target node, where the condition of the target node is determined via the output data of the ML algorithm.

FIG. 2 indicates a first exemplary embodiment for illustrating the method in accordance with the disclosed embodiments of the invention. In the graphical representation in FIG. 2, which is based on a P&I diagram of a process engineering plant, certain components necessary for the operation of the process engineering plant are represented as nodes K and the piping running between the components is represented as working lines. In the heavily simplified cutout of the P&I diagram represented as a graphic, the flow direction extends along the arrow directions, generally from top to bottom with diagonal connections to the next neighbors, where some connections are missing. Here, the components of the nodes represent temperature measurement points within a piping system. The node points accordingly correspond to a pipe section, at which the temperature of the conveyed liquid is measured with a sensor (temperature sensor). The arrows between the nodes indicate the flow direction of the liquid between pipe sections with the sensors. Component and sensor are accordingly to be considered as identical in this exemplary embodiment. In general, each component of a node of the graphical representation is connected to more than one sensor.

In this exemplary embodiment, for the target node K43, an ML algorithm is now to be trained, which is to monitor the condition of the piping at this measurement point, by the temperature in the pipe section being estimated via the ML algorithm. The measurement point within the piping diagram is represented by the target node K43. For the condition determination of the pipe section at the target node, due to the circumstances of this application case, only the data sets of the temperature sensors lying upstream are relevant, as only these contain information about the liquid that flows in the pipe section that is represented by the target node. Furthermore, temperature sensors lying far away upstream can be ignored, as their information is reflected in the data sets of the later sensors and strongly mixes with the information of irrelevant sensors before reaching the target sensor. In this example, a maximum distance of two nodes is therefore chosen between the target node and the input node ascertained as relevant. The metric is therefore the length of the shortest path here. In FIG. 2, the input nodes K32, K22, K33, K23 and K24 of the target node K43 can be identified in the area shaded in dark gray. Only the data sets of the sensors of the input nodes K32, K22, K33, K23 and K24 are therefore used for the training of the ML algorithm of the target node. The data sets of the further-away sensors of the nodes KOO to K16 of the area highlighted in light gray do not have to be used when training the ML algorithm and are insignificant for the condition of the pipe section that is represented by the target node. The data sets that are related to the nodes arranged downstream behind the target node are irrelevant for the condition determination of the target node.

FIG. 3 indicates a second exemplary embodiment for illustrating the method in accordance with the disclosed embodiments of the invention. In this graphical representation, the nodes represent pipe sections within a piping system, at which both the temperature of the conveyed liquid is measured by a sensor (temperature sensor) and the pressure within the pipe section is also measured by a further sensor. Here, the arrows between the nodes also indicate the flow direction of the liquid between the pipe sections with the sensors. Accordingly, in this exemplary embodiment each component (=pipe section) is connected to two sensors (here temperature sensor and pressure sensor).

In this exemplary embodiment, the node K33 is selected as a target node, for which an ML algorithm is to be trained, which is to monitor the condition of the piping in this pipe section. Here, the input node is selected in accordance with a rule. For the ML algorithm, only the data sets of the pressure sensors of the neighboring nodes (i.e., the node with a distance of at most one node away from the target node) are taken into consideration, and the data sets of the temperature sensors of the nodes lying upstream at a distance of 2 to 3 nodes. Thus, the nodes K22, K23, K24, K43 and K44 are determined as input nodes, where only the data sets of the pressure sensors of the nodes are relevant for the condition determination of the pipe section of the target node K33. The graphical representation in FIG. 3 involves the nodes in the field P highlighted in light gray. In addition, the nodes in the field T highlighted in dark gray are also determined as input nodes, where only the data sets of the temperature sensors are taken into consideration.

Figure 4:
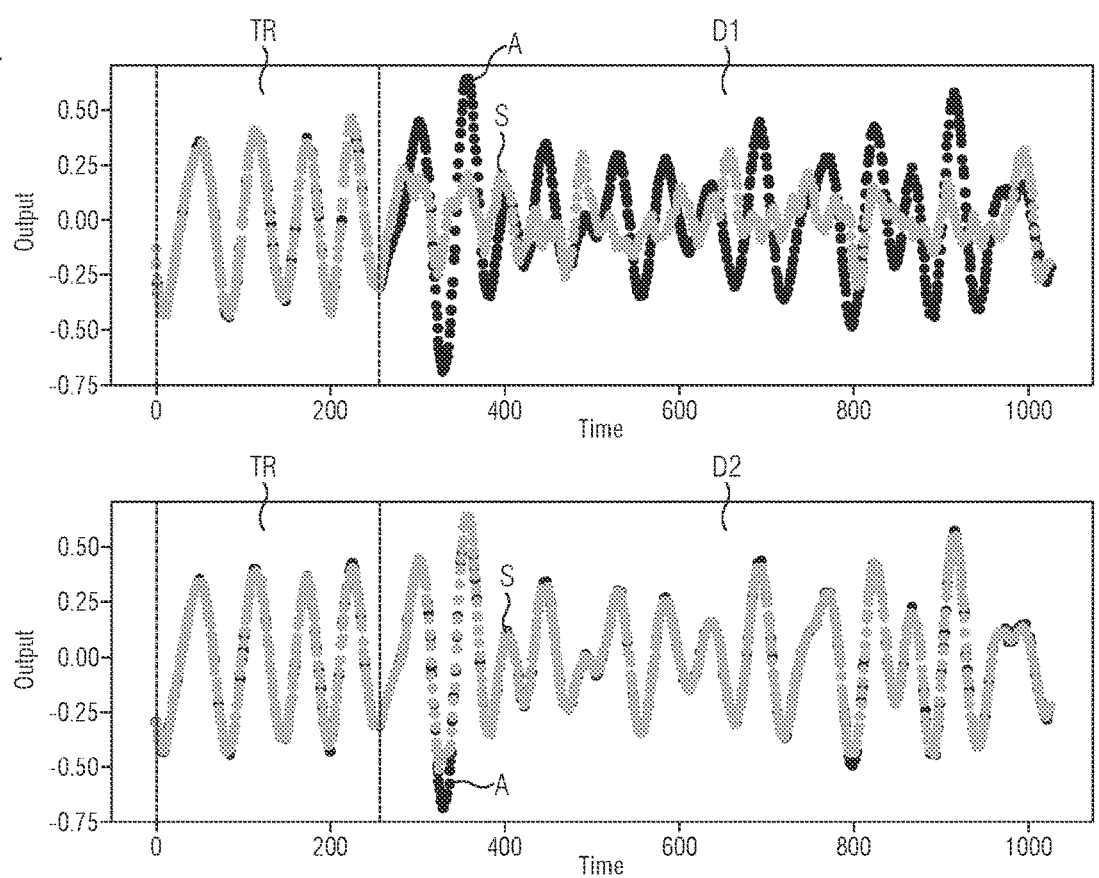
FIG. 4 shows two examples of the temporal progressions of an estimated value, resulting from the ML algorithm, of a process variable of a monitored component of a plant in accordance with the invention.

The selection of only certain relevant data sets as input data sets for an ML algorithm in accordance with disclosed embodiments of the method in accordance with the invention contributes to a considerable improvement of the output variable calculated by means of the algorithm. This is to be illustrated based on the two diagrams in FIG. 4. Both diagrams show the temporal progression of the output variable of the ML algorithm for the process value of the component of the target node K43 from exemplary embodiment 1 (cf. FIG. 2). The node K43 from FIG. 2 represents a temperature sensor in a pipe section of a piping system. With the ML algorithm, the temperature measurement value can be estimated on the basis of the input data sets, i.e., the data sets of the input nodes. In both diagrams D1 and D2, the output variable A of the ML algorithm used is plotted against time. In addition, the target or setpoint value of the output variable S is plotted against time. Also marked in both diagrams is the period of time TR which has been spent for the training of the algorithm.

In diagram D1, it is possible to identify that, during the training phase TR, the two progressions of the output variable, i.e., the setpoint values and the temperature values calculated via the ML algorithm, still approximately match. In the evaluation phase, however, significant deviations occur in D1. The reason for this is that the training data sets for the ML algorithm in diagram a1 also contain irrelevant input data sets, while in diagram D2 only training data sets that are relevant in accordance with disclosed embodiments of the invention were used for the calculation of the estimated temperature values. In diagram D1, the ML algorithm was trained in via the data sets of all nodes (60 temperature sensors) of the graphical representation shown in FIG. 2. In diagram D2, the ML algorithm was only trained in by the relevant data sets of the nodes K22, K23, K24, K32 and K33 of the graphical representation shown in FIG. 2. In this manner, it is possible to achieve a considerable improvement of the condition monitoring of the pipe section under consideration.

The disclosed embodiments of the invention are preferably realized as software and also as hardware, for example, with the use of a specific electrical circuit, or are implemented as a combination of software and hardware, such as an apparatus for data processing.

Figure 5:
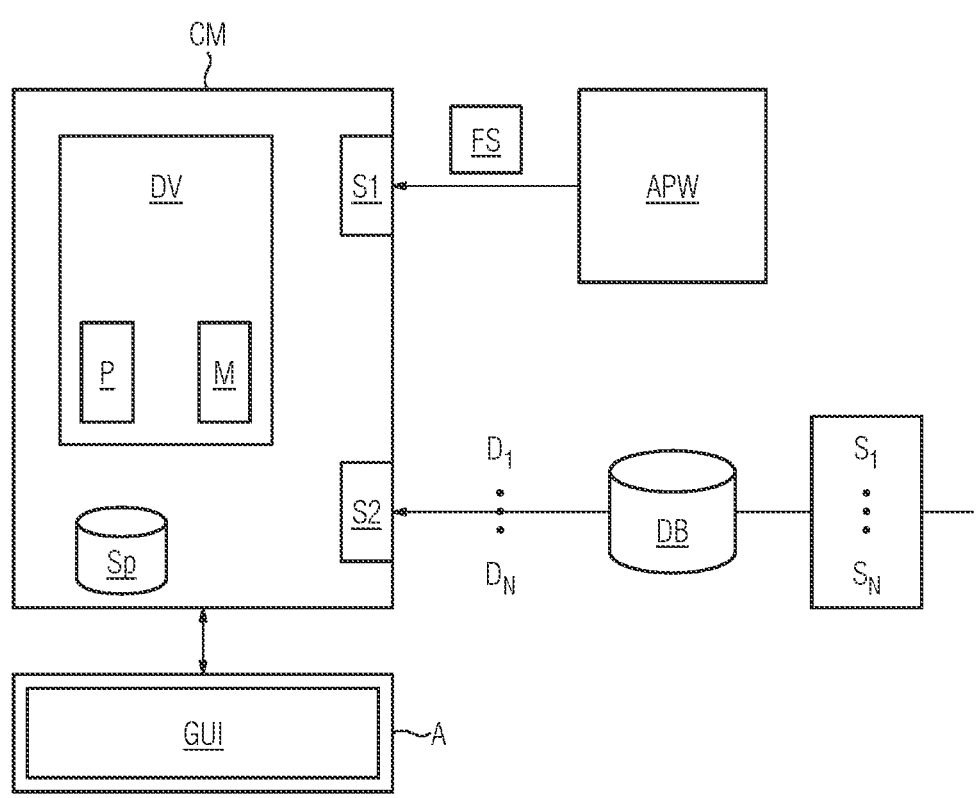
FIG. 5 shows an exemplary embodiment of an apparatus for performing the method in accordance with the invention for monitoring a condition of a component of a process engineering plant.

FIG. 5 shows an exemplary embodiment of an apparatus CM for monitoring a condition of a component of a process engineering plant. In this embodiment, the apparatus CM has at least one interface S1 for receiving a digital flow diagram FS of the technical plant. Such a flow diagram or piping diagram (P&I diagram), possibly consisting of multiple sub-images, is usually created via a plant planning tool APW in a conventional manner, for example, by a plant planner or technologies by linking graphical process objects that represent the components of the technical plant. The apparatus CM furthermore has at least one further interface S2 for receiving data sets al to DN (N=natural number), or variables derived therefrom of sensors S1 to SN that are connected to at least one component of the process engineering plant. The data sets, detected by the sensors, with process variables can be temporarily stored in a database DB. Alternatively, the apparatus CM can also have a single interface, which is embodied to receive any given data and/or files.

Furthermore, the apparatus CM has at least one data processing facility DV which, based on the transmitted digital flow diagram and the transmitted sensor data sets, performs the method in accordance with the disclosed embodiments of the invention. The apparatus CM can further comprise an archive or any other given storage unit SP or database, in which the flow diagrams or graphics are stored, for example. The data processing facility DV has at least one processor P or CPU and a working memory M. The disclosed embodiments of the invention implemented when as a computer program can be kept available in the working memory M, for example, or can be loaded into it, from where it can be performed with the aid of the at least one processor P.

Furthermore, the apparatus can have a display unit A, or can be connected to one, which is configured such that a component of the technical plant can be monitored on a user interface GUI. Via the graphical user interface, an operator can interact with the data processing facility DV of the apparatus CM as desired.

Figure 6:
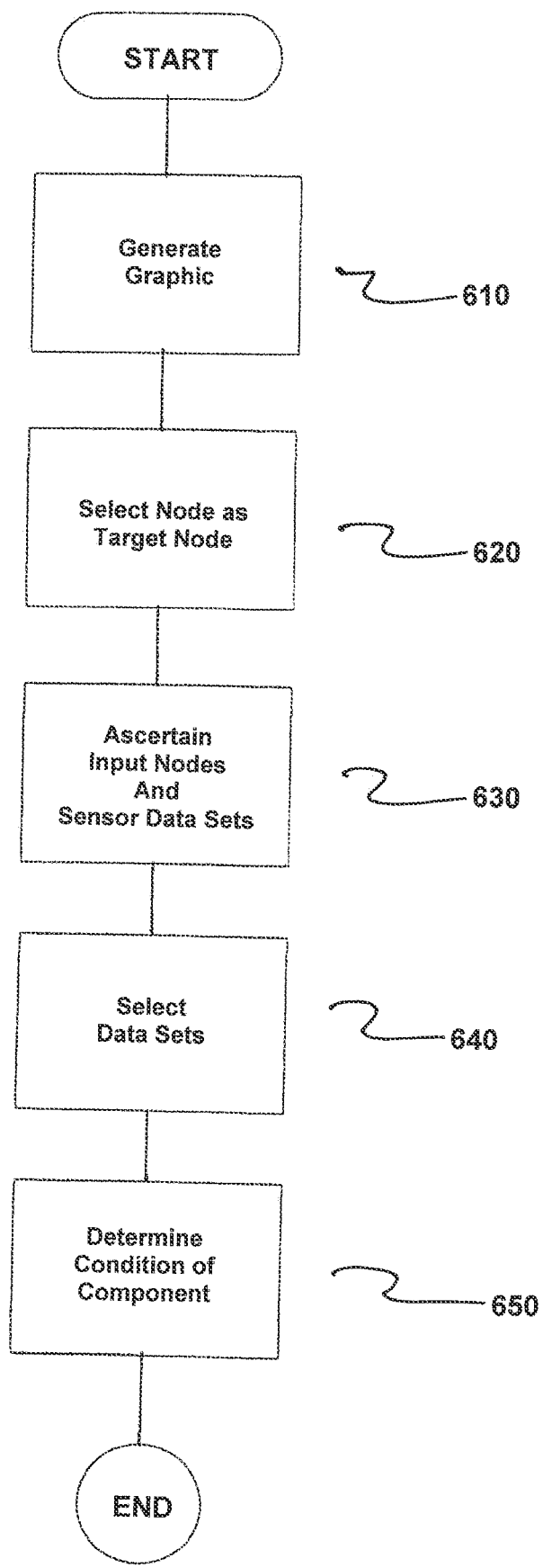
FIG. 6 is a flowchart of the method in accordance with the invention.

FIG. 6 is a flowchart of the method for monitoring a condition of a component of a process engineering plant including a large number of interconnected components that are connected to one another from a process engineering perspective, where a condition of a component is determined based on process variables of at least one sensor relevant for the component and corresponding data sets are recorded and stored for each sensor.

The method comprises generating a graphic from a digital flow diagram of the technical plant, which contains the structure of the technical plant with its components and functions thereof as additional information and functional relationships thereof, as indicated step 610. In accordance with additional information and relationships specified from the flow diagram, the generated graphic contains the components of the technical plant as nodes and the functional relationships between the components as working lines, according to a flow direction of the flow diagram.

Next, a node is selected as a target node that corresponds to a component, a condition of which is to be monitored via a machine learning (ML) algorithm, as indicated in step 620.

Next, input nodes and sensor data sets of the input nodes, which are relevant for the monitoring of the component to be monitored, of the target node selected in advance, in accordance with at least one of a rule and a metric, are ascertained, as indicated in step 630.

Next, the data sets of the relevant sensors as input data are selected for training the ML algorithm of the target node, as indicated in step 640.

Next, the condition of the component to be monitored via the output data of the ML algorithm is ascertained, as indicated in step 650.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a condition of a component of a process engineering plant including a large number of interconnected components that are connected to one another from a process engineering perspective, a condition of a component being determined based on process variables of at least one sensor relevant for the component and corresponding data sets being recorded and stored for each sensor, the method comprising:

generating a graphic from a digital flow diagram of the technical plant, which contains the structure of the technical plant with its components and functions thereof as additional information and functional relationships thereof, in accordance with additional information and relationships specified from the flow diagram said generated graphic containing the components of the technical plant as nodes and the functional relationships between the components as working lines, according to a flow direction of the flow diagram;

selecting a node as a target node which corresponds to a component, a condition of which is to be monitored via a machine learning (ML) algorithm;

ascertaining, in accordance with at least one of a rule and a metric, input nodes and sensor data sets of the input nodes, which are relevant for the monitoring of the component to be monitored, of the target node selected in advance;

selecting the data sets of the relevant sensors as input data for training the ML algorithm of the target node; and determining, a condition of the component to be monitored via the output data of the ML algorithm.

2. The method as claimed in claim 1, wherein at least one of the rule and metric is specified or selected by an operator.

3. The method as claimed in claim 1, wherein the data sets for each sensor correspond to measurement values of the process variables or simulated values of the process variables.

4. The method as claimed in claim 1, wherein training of the ML algorithm occurs in advance or during ongoing operation of the technical plant.

5. The method as claimed in claim 1, wherein a time range of the training is settable.

6. An apparatus for monitoring a condition of a component of a process engineering plant including a large number of interconnected components from a process engineering perspective, each component being connected to a plurality of sensors for detection of data sets of process variables, the apparatus comprising:
- an interface for receiving a digital flow diagram of the technical plant;
- a further interface for receiving the data sets or variables derived therefrom of the plurality of sensors of the components of the technical plant, and
- a data processing facility;
- wherein the data processing facility of configured to:
  - generate a graphic from a digital flow diagram of the technical plant, which contains the structure of the technical plant with its components and functions thereof as additional information and functional relationships thereof, in accordance with additional information and relationships specified from the flow diagram said generated graphic containing the components of the technical plant as nodes and the functional relationships between the components as working lines, according to a flow direction of the flow diagram;
  - select a node as a target node which corresponds to a component, a condition of which is to be monitored via a machine learning algorithm;
  - ascertain, in accordance with at least one of a rule and a metric, input nodes and sensor data sets of the input nodes, which are relevant for the monitoring of the component to be monitored, of the target node selected in advance;
  - select the data sets of the relevant sensors as input data for training the ML algorithm of the target node; and
  - determine, a condition of the component to be monitored via the output data of the ML algorithm.

7. The apparatus as claimed in claim 6, further comprising:
- a display unit, which is configured such that via a user interface at least one selection of a target node occurs, which is related to the component which is to be monitored, and such that any given interactions of an operator with the data processing facility is performable.

8. A non-transitory computer-readable product encoded with a computer program which, when executed by a computer, causes monitoring of a condition of a component of a process engineering plant including a large number of interconnected components that are connected to one another from a process engineering perspective, a condition of a component being determined based on process variables of at least one sensor relevant for the component and corresponding data sets being recorded and stored for each sensor, the computer program method comprising:
- program code for generating a graphic from a digital flow diagram of the technical plant, which contains the structure of the technical plant with its components and functions thereof as additional information and functional relationships thereof, in accordance with additional information and relationships specified from the flow diagram said generated graphic containing the components of the technical plant as nodes and the functional relationships between the components as working lines, according to a flow direction of the flow diagram;
- program code for selecting a node as a target node which corresponds to a component, a condition of which is to be monitored via a machine learning (ML) algorithm;
- program code for ascertaining, in accordance with at least one of a rule and a metric, input nodes and sensor data sets of the input nodes, which are relevant for the monitoring of the component to be monitored, of the target node selected in advance;
- program code for selecting the data sets of the relevant sensors as input data for training the ML algorithm of the target node; and
- program code for determining, a condition of the component to be monitored via the output data of the ML algorithm.

9. The non-transitory computer-readable product as claimed in claim 8, wherein the non-transitory computer-readable program product comprises a data carrier or storage medium.

* * * * *